United States Patent [19]
Miller, II et al.

[11] Patent Number: 5,787,685
[45] Date of Patent: Aug. 4, 1998

[54] PROCESS AND APPARATUS FOR FILLING LIQUID FUEL STORAGE CONTAINERS AND ASSEMBLING SUCH CONTAINERS INTO FLUID FUELED AIRBAG INFLATORS

[75] Inventors: Harry W. Miller, II, Ogden; Karl K. Rink, Liberty; Walter A. Moore, Ogden; Don T. Jensen, Mt. Green, all of Utah

[73] Assignee: Autoliv ASP, Inc., Ogden, Utah

[21] Appl. No.: 716,123

[22] Filed: Sep. 19, 1996

[51] Int. Cl.$^6$ ............................................. B65B 3/04
[52] U.S. Cl. ..................... 53/467; 53/471; 53/489; 141/263
[58] Field of Search ................... 141/263; 53/467, 53/471, 489

[56] References Cited

U.S. PATENT DOCUMENTS

| | | | |
|---|---|---|---|
| 3,040,787 | 6/1962 | Knoll | 141/263 X |
| 3,056,436 | 10/1962 | Fechheimer et al. | 141/263 X |
| 3,070,137 | 10/1962 | Ellett | 141/263 X |
| 3,559,702 | 2/1971 | Riesenberg | 141/263 X |
| 4,932,445 | 6/1990 | Biehl | 141/263 X |
| 4,957,147 | 9/1990 | Lowe | 141/263 X |
| 5,193,593 | 3/1993 | Denis et al. | 141/263 X |
| 5,196,669 | 3/1993 | Richardson | 53/403 X |
| 5,424,509 | 6/1995 | Schauggard et al. | 219/75 X |
| 5,470,104 | 11/1995 | Smith et al. . | |
| 5,494,312 | 2/1996 | Rink et al. . | |
| 5,495,699 | 3/1996 | Buckley | 53/81 |
| 5,531,473 | 7/1996 | Rink et al. . | |
| 5,551,493 | 9/1996 | Sonntag et al. | 141/263 |

*Primary Examiner*—Daniel Moon
*Attorney, Agent, or Firm*—Sally J. Brown

[57] ABSTRACT

The use of unitary liquid fuel storage chambers provides advantages in the manufacturing and assembly of inflators for use in airbag passive restraint systems. A unique process of injecting liquid fuel through a conduit which is controlled to discharge the liquid fuel beneath the rising surface of the liquid fuel in the container and then sealing the storage chamber with a unique stopper provides consistently accurately filled unitary fuel containing storage chambers. The filled and sealed unitary storage chambers can then be either stored or assembled into an inflator. The assembly of the inflator can be at a location separate from that at which the storage container is loaded with fuel, whereby the relatively hazardous loading and handling of liquid fuels can be separated from the inflator assembly area.

1 Claim, 3 Drawing Sheets

PROCESS AND APPARATUS FOR FILLING LIQUID FUEL STORAGE CONTAINERS AND ASSEMBLING SUCH CONTAINERS INTO FLUID FUELED AIRBAG INFLATORS

BACKGROUND OF THE INVENTION

1. Field of the Invention

This invention relates to a process and an apparatus for use in charging fluid fueled inflators. It is particularly intended for use filling inflators used in airbag passive restraint systems. Such airbag systems are being provided in most automobiles presently being produced in this country. Typically, these systems rely on a crash sensor activating an inflator to provide sufficient non-toxic gas to cause an airbag to rapidly inflate into space between a vehicle passenger compartment's interior and a location normally occupied by an occupant of the vehicle. A number of different types of inflators have been developed for use in such systems. Most of the early inflators relied on a compressed gas or on the rapid combustion of a gas-generating solid material, such as sodium azide. A recently introduced inflator relies on the combustion of fluid fuels. This invention is directed to the assembly of such inflators and, particularly, to a method and apparatus of loading liquid fuel to a storage chamber which is then incorporated in such an inflator. Prior to the introduction of the fluid fueled inflator, there was no commercial need for a safe, accurate, high-speed method and apparatus for charging fixed quantities of volatile, combustible, liquid fuels to airbag inflators. The method of charging a liquid fuel to such inflators must provide for a consistent and accurate quantity of filled combustible fluid fuel, provided in a safe manufacturing environment. It must also provide for sealing the fluid fuel container in a manner which will maintain the fuel content in the container relatively constant over the extended lifetime, typically fifteen years, and in the extended tropic to arctic environments in which modern vehicles are expected to function. The disclosed method and apparatus is designed to achieve such performance.

2. Description of Related Art

U.S. Pat. No. 5,470,104, entitled *FLUID FUELED AIR BAG INFLATOR*, issued Nov. 28, 1995, describes fluid fueled inflators of the type to which the present invention relates. In particular, the present invention is directed to the loading of liquid fuels into separate fluid fuel storage elements similar to those illustrated in the inflator embodiments of FIGS. 2 and 3 of the patent, and the subsequent assembly of inflators using such loaded storage elements and other components.

U.S. Pat. No. 5,494,312, issued Feb. 27, 1996, entitled *AUTOIGNITION OF A FLUID FUELED INFLATOR*, further describes fluid fueled inflators of the type to which the present invention relates. This patent describes the relationship between the storage capacity of a fuel storage element and the degree to which it is filled and the effect such can have, along with other parameters, on the rupture point temperature of the storage element and on the autoignition temperature of the stored fuel. The present invention describes fuel storage containers and methods of filling such with fuel and assembling such filled fuel chambers in an inflator.

Related U.S. application Ser. No. 08/565,332, filed Nov. 30, 1995, now U.S. Pat. No. 5,673,933 describes the use of unitary storage chambers, or canisters, for loading and storing certain of the fluid materials used in fluid fueled inflators. This application also describes a method of sealing a storage chamber after it has been loaded with a gaseous component. The present application is directed to a method of assembling an inflator using a liquid fuel container and a method and apparatus for loading liquid fuel to such liquid fuel containers.

Related U.S. application Ser. No. 08/572,452, filed Dec. 14, 1995, Now abandoned describes pre-loaded fuel capsules for use in fluid-fueled inflators. The present application describes methods of loading such capsules with liquid fuels, and assembling such loaded capsules into inflators.

The above patent and patent applications are commonly assigned with this application and are hereby incorporated by reference.

SUMMARY OF THE INVENTION

A primary objective of the present invention is the provision of a method and apparatus for safely and accurately filling storage chambers with liquid fuels. In accord therewith, it is a further objective to provide a method and apparatus which consistently fills the fuel storage chamber with the desired fill fraction of liquid fuel while excluding any significant formation of bubbles or similar entrained gases in the charged liquid.

It is a further objective to avoid the hazards associated with charging an otherwise fully assembled inflator with combustible fuels by providing a method of loading and sealing the liquid fuel in a unitary storage chamber at a first loading location having appropriate safeguards for handling combustible liquid fuels and thereafter assembling the loaded and sealed unitary storage chamber into the inflator at another inflator assembly location.

The invention involves loading fuel storage containers with a predetermined quantity of liquid fuel in a controlled atmosphere including feeding the fuel through a conduit which discharges the major portion of the fuel beneath the rising surface of fuel in the storage container and discontinuing the fill when an amount sufficient to fill the container to the proper fraction has been discharged therein. The fill port of the fuel container is then closed and sealed prior to either storing or moving them to another location where they can be assembled as a sealed unit in an inflator.

BRIEF DESCRIPTION OF THE DRAWING

FIGS. 5B and 5C illustrate subsequent operations occurring within the circle "C" of FIG. 5A.

DETAILED DESCRIPTION OF THE INVENTION

Figure 1:
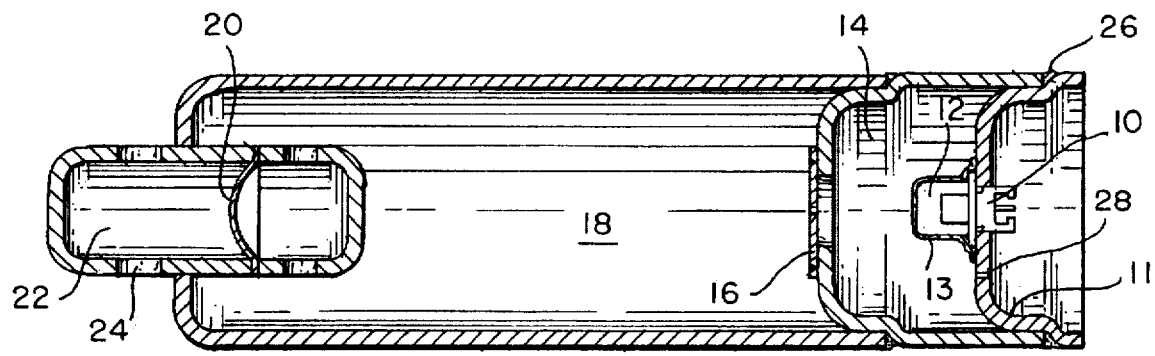
FIG. 1 is an illustration of a fluid fueled inflator assembled by a previous method.

The fluid fueled inflator illustrated in FIG. 1 includes an electrically activated igniter, or squib 10, which is mounted on an end closure 11 so that, when activated, it fires hot ignition products into a fluid fuel storage chamber 12, defined in part by metal cup 13, causing the fuel to expand and rupture the chamber 12. The fuel and ignition products from the squib are then propelled into, and combust with, oxidizing gases provided in combustion chamber 14, producing combustion products at elevated temperature and pressure which cause a rupture disc 16 to open. The combustion gases then pass into compressed gas chamber 18 where they mix with, heat and cause a pressure increase of the compressed gas stored in that chamber. The expanded gases cause a further rupture disc 20 to open, allowing the expanded gases to pass through the diffuser 22 and exit the inflator via ports 24, from which the expanded gases can be directed to inflate an airbag cushion.

The fuel storage chamber 12 can be loaded with a gaseous or a liquid fuel. In the past, the chamber 12 was provided as a die-forged metal cup 13 having a round opening in its bottom which was sized to be press fit over the squib 10. Liquid fuel was loaded to the cup through a needle inserted through the round opening. The squib was then press fit into the opening to effectively close and seal the fuel chamber. The squib and fuel chamber assembly would then be assembled to the end closure 11, which closure would then be assembled to the remainder of the inflator, usually by an inertial weld 26 applied at its periphery. The injection of fuel into cup 13 and subsequent processing of the cup-squib assembly on the inflator assembly line presented safety problems due to the flammable and volatile nature of the fuel, coupled with its unconfined access to oxidants such as the oxygen in air. Additionally, potentially high amounts of water vapor in the air posed problems due to the highly hygroscopic nature of the fuels (such as ethyl alcohol). Moreover, fuel vapors were released in the environment surrounding the fuel cup, possibly causing harm to the operators. The assembly was also found to be deficient in that the press fit of the cup over the squib was not as reliable as is desirable. For instance, differing coefficients of expansion of the materials providing the press fit could result in leakage over the extended lifetime and extended environmental conditions to which modern vehicles are exposed.

The present invention is directed to providing a sealed fuel storage container containing a liquid fuel, such as kerosene, gasoline or methyl, ethyl or propyl alcohol, which can be either substituted for, or loaded in, cup 13. The sealed storage container can also contain a liquified gaseous fuel, such as liquified propane or butane. The liquid fuel containing sealed unit can be prepared at a special installation designed for the safe loading of volatile, flammable liquids; and after being loaded and sealed can be stored and/or moved to and assembled into an inflator at another inflator assembly location in relative safety.

Figure 2:
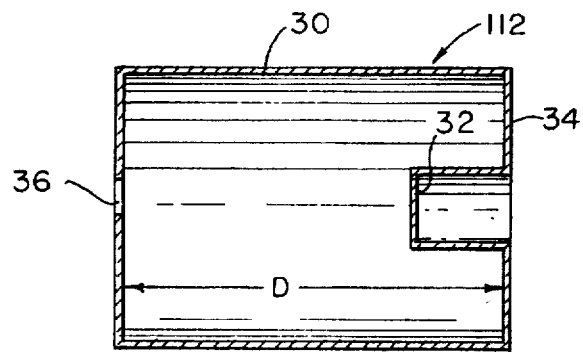
FIG. 2 is an illustration of a liquid fuel storage container used in the present inflator assembly method.

FIG. 2 illustrates one embodiment of a liquid fuel storage container. The fuel container 112 is formed from metal, plastic or ceramic, in a generally cylindrical shape provided by cylindrical side wall 30. An igniter pocket 32, shaped so as to partially surround the igniter or squib 10, can be provided in the bottom end closure 34 of the fuel container. Such an igniter pocket 32 could extend into the container 10 to 30% of the distance D between the fill port 36 and the interior wall of the bottom end closure 34. The container can include designated weakened areas which will preferentially open, or rupture, when the squib is activated. It should be noted that the efficiency or completeness of combustion can be enhanced for given situations through judicious placement of the preweakened areas. For example, we have found under certain conditions, that the combustion reaction is enhanced if such weakened areas are provided in the cylindrical side wall 30 whereby the liquid fuel is directed toward the side of the combustion chamber 14. In general, we have found that side discharge mechanisms work well with relatively large combustion chamber volumes. They do not work as well with extremely small combustion chambers because liquid fuel is discharged directly onto the relatively cold wall of such chambers. Similarly, the cup 13 can be provided with pre-weakened areas complementing those provided on the fuel container. The top end of the fuel container is closed except for a fill port 36, which is closed with a stopper, or plug, and sealed after the storage container is filled. An alternative embodiment could have a neck extending upward from the fill port. Such a container could be closed and sealed either with a similar stopper or by crimping a metal cap over the neck.

The fuel container is subject, either directly or indirectly through the metal cup 13, to the pressure of the oxidizing gas stored in the combustion chamber 14. The oxidizing gas can be stored at relatively high pressure, for instance 500 to 2000 psia. Accordingly, the fuel container should be designed to withstand such external pressures. We have found that fuel containers made of steel having a thickness in the range of approximately 0.0065 inch to approximately 0.0150 inch perform satisfactorily.

The fuel storage container design is further dependent on the fuel fill fraction to be charged thereto (the fuel fill fraction is the volumetric ratio of the liquid fuel volume to the total internal volume of the fuel storage container). As explained more fully in commonly assigned and incorporated U.S. Pat. No. 5,494,312, the degree to which the fuel storage element is filled with liquid fuel, i.e. the fuel fill fraction, is a parameter which can be adjusted to control the auto-ignition temperature of the inflator. In addition, the thermal expansion characteristics of most liquid fuels make it necessary to maintain a fraction of the internal volume of the fuel storage containers free of liquid fuel. Because the inflator and its fuel storage container must function over an extreme range of ambient temperatures (usually taken to be $-40°$ C. to $107°$ C.), the fuel will necessarily attempt to expand and contract. If free, or void, space is available for liquid expansion, a relatively simple and benign compression of the gas phase constituents occupying the void space occurs. While such constituents could involve many different components, they typically comprise a mixture of air and fuel vapor. If no free, or void, space is available for liquid expansion, a hydraulic situation develops in the fuel storage container and the corresponding pressure increase in such container is dramatic and could be sufficiently severe to cause failure of the container. Accordingly, the design of the fuel storage container needs to accommodate an appropriate fill fraction to permit the expansion of the fluid fuel at the high end of its design ambient temperature range, while also assuring that the container is sufficiently strong to maintain its integrity in the high pressure of the oxidizing gas stored in the combustion chamber. Optionally, the fuel storage container can be designed to accommodate a fill fraction selected to cause auto-ignition of the inflator at a preselected desired temperature. The design fill fraction will be dependent on the particular fuel, the structural characteristics of the fuel storage chamber, the maximum temperature of the ambient temperature range specified and, optionally, the desired auto-ignition temperature.

Figure 3:
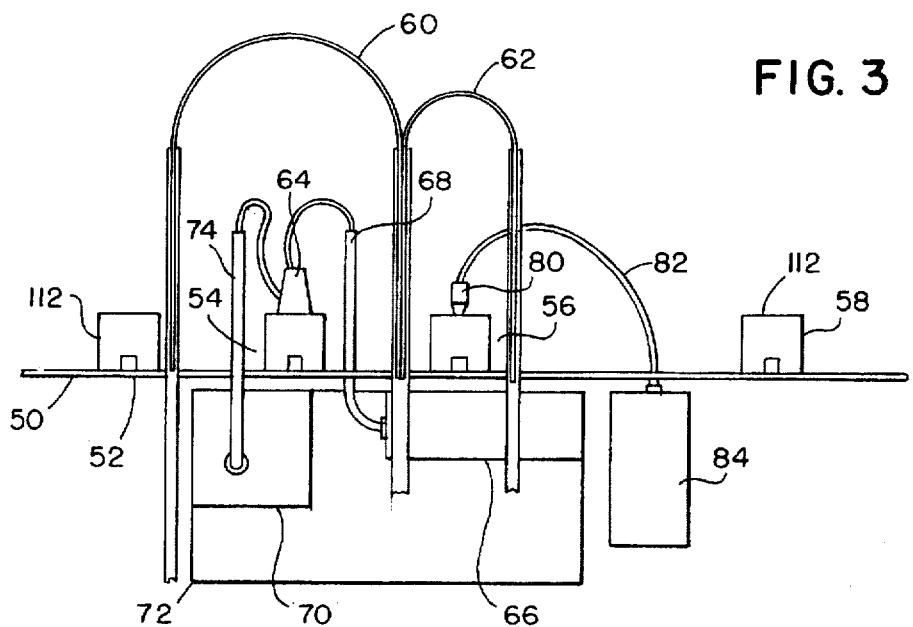
FIG. 3 is an illustration of an installation for filling the liquid fuel storage containers illustrated in FIG. 2.

FIG. 3 illustrates an installation for filling the liquid fuel storage containers 112. A conveyor belt 50 is provided to move fuel containers 112 from a first station 52 where empty storage containers 112 are loaded on the conveyor, to a second station 54 where liquid fuel is loaded in the containers 112, then to a third station 56 where a plug or ball is welded in the fill port, and finally to a fourth station 58 where the filled and sealed storage container is off loaded from the conveyor. The fuel containers can be loaded directly on the conveyor belt and the belt started and stopped to transfer the container from one station to the next. However, we find it to be particularly advantageous to load the container in a nesting structure on a pallet and accomplish the transfer between stations by lowering the pallet onto a continuously running conveyor. Upon reaching the next station the pallet is raised off of the running conveyor by a raising and locating device as simple as three or four pins which rise from positions just outside the running conveyor belt to engage mating structures on the bottom of the pallet. The pins cooperate with the pallet and the mating structures and nesting structure thereon to align the fill port on the storage container with the filling and sealing apparatus provided at the second and third stations. The second station 54 and the third station 56 are located under hoods 60 and 62. Fabric baffles (not shown) are located over the path of the conveyor as it enters and exits the hood 60 over the second station 54, and, optionally as it exits the hood 62 over the third station 56. The second station 54 and the third station 56 are maintained under a slight vacuum provided from an exhaust fan or other vacuum source (not shown) in order to constantly remove from the installation any potentially explosive or combustible vapors given off by the liquid fuel. At the second station 54, a fill head 64 is located in place on top of the fuel container 112 where it forms a seal with a mating surface on the fuel container. Fill head 64 is operatively connected to a vacuum pump 66 through conduit 68. Fuel pump 70 provides liquid fuel from the fuel tank 72 through conduit 74 to a fuel fill needle or conduit 78 (see FIG. 4) located within the fill head 64. A flow meter for measuring the amount of fluid fuel charged to each container is provided at any convenient location between the fuel pump and the fuel fill needle. A stopper insertion device, a preferred embodiment of which is illustrated in FIG. 5A, is also located at the second station. The stopper insertion device is mounted so as to be capable of being moved into position where it can insert a plug in the fill port after the liquid fuel fill is completed. A welding device 80 which is capable of welding the plug to adjoining portions of the fuel container, by such as a laser or ultrasonic weld, is provided at the third station 56. A suitable power cable 82 connects the welding device 80 to a welding power supply apparatus 84. Multiple filling lines can be provided across a single conveyor and hood assembly by providing a separate fill head 64, stopper insertion device and welding device 80 for each of the filling lines.

Figure 4:
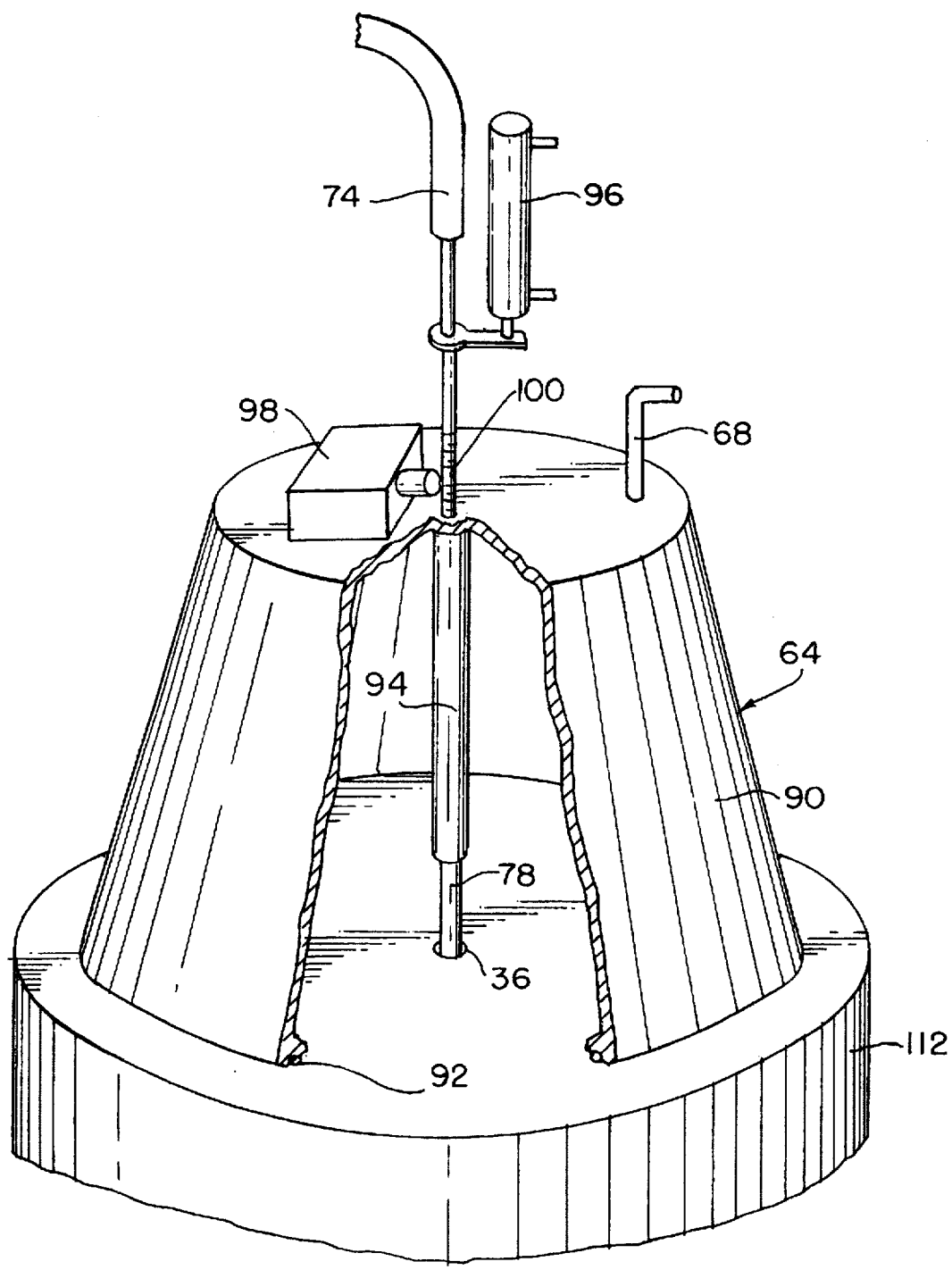
FIG. 4 illustrates a fill head, partially in cutaway, used in the installation illustrated in FIG. 3.
Figure 5A:
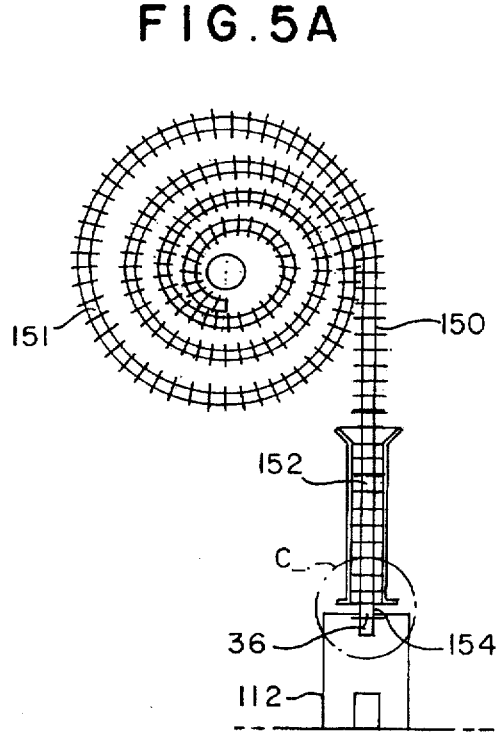
FIGS. 5A, 5B, and 5C illustrate a method of closing the fill port of the liquid fuel storage container illustrated in FIG. 2.

The fill head 64 is schematically shown in position on top of a fuel storage container 112 in FIG. 4. The fill head 64 comprises a housing 90 having a sealing structure, such as an O-ring 92, located around the periphery of its open bottom. The fill head includes an operative connection to the vacuum conduit 68, to provide a vacuum which, when the O-ring seal is mated to the fuel storage container, exhausts the interior chamber of the fill head of any ambient atmosphere introduced either during the transfer operation or by leakage and removes any fuel vapors emanating from the storage chamber. A fill conduit, or fill needle 78, passes through a fill needle housing tube 94, which guides the needle to the fill port 36 in the top surface of the storage container 112. The fill needle is operatively connected to the fuel pump 70 through fuel transfer conduit 74. The fill needle 78 is operatively connected to a conventional raising and lowering mechanism, such as a reversible motor or, as shown, a fluid-activated, i.e. hydraulic or pneumatic activated, cylinder 96, for inserting and retracting the fill needle to and from its fill position in the storage chamber 112. The raising and lowering mechanism could be mounted at a convenient location either inside of the evacuated interior chamber or, as shown, on the outside of the fill head. A fill needle position sensing device 98 may also be provided on or about the fill head 64. Such a sensing device could comprise on-off electrical or optical relays located at locations along the path of fill needle reciprocation or, as shown, an optical reader capable of reading indices 100 located along the length of the fill needle. The sensing device 98 could be mounted in conjunction with the fill needle housing tube 94, the raising and lowering mechanism 96 or, as shown, at a separate location on the fill head.

The fuel loading operation commences when a fuel storage container 112 is placed on the conveyor belt 50 at the first station 52. A container 112 can be provided for each of the filling lines provided in the installation. The conveyor is then operated to advance the container through the fabric baffle, to the second station 54 in hood 60.

Figure 5B:
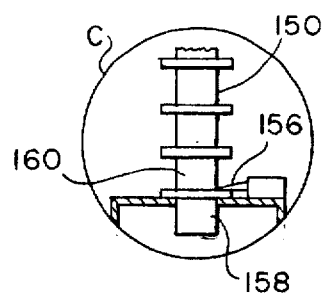

At the second station, the fill head 64 is positioned on top of the container 112 where it forms a seal with a mating surface provided on the container. The vacuum created by the vacuum pump 66 through conduit 68 removes any vapors, such as volatilized fuel or stray oxidant, from within the fill head. The fill needle is lowered into the fuel storage container 112 to an initial position near the bottom of the container, i.e. within the bottom one-fourth of the container, and, preferably, within the bottom one-tenth of the container. The sequence of steps can be controlled by a timed sequence of steps calibrated to provide the required conditions for the specific storage container and specific fuel fill involved. Preferably, a more positive control can be provided by sensing the location of the fill needle within the container with a position sensing device 98. When the sensing device determines that the needle is at its desired initial position near the bottom of the container, it provides a signal which is operative to discontinue any further lowering of the fill needle into the container. For instance, the sensing device 98 could function to discontinue the flow of hydraulic or pneumatic fluids to the cylinder 96. Alternatively, the sensing device could turn off a motor (not shown) which provides an alternative motive force for lowering the fill needle in the container. The flow of liquid fuel through the fill needle is then initiated. Only after sufficient liquid fuel has been charged to the container to submerge the discharge of fluid fuel from the needle, is retraction of the fill needle from the container begun. The rate of such retraction is controlled such that the needle is always beneath the surface of the fuel discharging in the container. When monitoring of the fuel meter establishes that sufficient fuel has been charged to the container to provide the desired fill fraction within the container, the flow of fuel to the fill needle is discontinued. By assuring that the major portion of the charging of liquid fuel to the fuel container is accomplished with the discharge of fuel from the fill needle occurring under the level of fuel in the container, the possible entrainment of gas or vapor in the flowing liquid is avoided and the formation of bubbles or other gaseous voids in the loaded liquid is also avoided. This makes it possible to consistently provide a precise quantity of the liquid fuel in the container which results in enhanced control and repeatability of the combustion process during activation of the airbag system. The fill needle is then withdrawn from the container 112, the vacuum provided through line 68 is turned off and the fill head 64 is moved away from the container. A push rod (not shown) may be mounted on the fill head 64 to push down on the container 112, if needed to break the seal formed between the container and the fill head. A stopper insertion device (such as is illustrated in FIGS. 5A and 5B, infra) is moved into position and activated to insert a stopper 158 in the container's fill port 36, following which the stopper insertion device is retracted. The storage container 112 is then moved by the conveyor 50 through a fabric curtain baffle to the third station 56 under hood 62.

A welding head on the welding device 80 is positioned adjacent the stopper 158 inserted in the container's fill port 36 so that upon activation of the power supply 84 the stopper is welded to the adjoining portion of the fuel container. Typically, the welding device and associated equipment are designed to provide either a laser weld or an ultrasonic weld. The stopper is designed to provide a leak proof closure of the fill port. The weld of such stopper to the adjoining portion of the container provides assurance of a hermetic seal over the extended lifetime and environmental conditions under which the airbag system is expected to function. Once the weld is complete, the welding device 80 is retracted and the storage container can be transferred to the fourth station 58 by conveyor 50. The filled and sealed storage container can be off-loaded from the conveyor and either conveyed directly to an inflator assembly area or packaged for storage and/or movement to the inflator assembly area. In order to provide the ability to track and locate storage containers for quality control purposes, the placing of serial markings (such as a bar-code) on each container is desirable. An apparatus for providing such serial markings on the wall of each storage container could be provided at any convenient location along the conveyor path. We find the fourth station to be suitable for providing the apparatus for and conducting the serial marking operation.

The filled and sealed storage container can be checked for leaks at any suitable location following the sealing of the stopper to an adjacent portion of the storage container. Preferably such leak check should be accomplished before removing the filled storage container from a special ventilation environment such as that provided in and about the fuel filling and sealing apparatus. The ability to check the fuel storage container for leaks prior to assembling such in an inflator assembly provides both safety and manufacturing advantages over the prior method of loading fluid fuel in inflators as they are finally assembled. A fuel leak in that is only discovered after the inflator is essentially fully assembled could necessitate discarding the entire inflator assembly. In contrast, a leak discovered in one of the present fuel storage containers prior to its fabrication into the inflator assembly, should not require the discard of anything greater than the filled storage container.

At the inflator assembly area, the liquid fuel filled and sealed storage container is incorporated into the assembly of an inflator, such as the inflator illustrated in FIG. 1, by placing the container 112 in the metal cup 13 and inserting the squib into the igniter pocket 32 of the container 112. This sub-assembly is then assembled to the end closure 11. The long term reliability of the assembly of the container 112 with the squib 10 and the end closure 11 is enhanced by welding the metal cup 13 to the end closure 11. The container 112 provides sufficient insulation of the liquid fuel loaded therein to allow welding of the metal cup 13 to the end closure. The end closure is then welded to the remainder of the inflator by a peripheral weld 26. A pressurized oxidizing gas can then be added to the oxidizing chamber 14 through a fill port 28 conventionally located in the end closure 11. It should be appreciated that this assembly procedure eliminates the need to transfer and load volatile liquid fuels, under conditions where they might mix with ambient oxidants to form combustible mixtures, at or in the vicinity of the inflator final assembly area. Accordingly, this assembly procedure significantly diminishes the risk of both accidental ignition of the liquid fuel and accidental exposure of operating personnel to the fumes given off by volatile liquid fuels.

The filled storage container could be operatively mounted adjacent the squib by other methods which do not rely on metal cup 13. For instance, the igniter pocket and the squib could be provided with complementary locking shapes, possibly augmented by an interlocking pin or plunger, whereby the storage container is firmly mounted to the squib.

Of course, the quantity of liquid fuel charged to the container could be controlled by techniques other than the described method of monitoring a flow meter. For instance, the liquid fuel could be passed from the fuel tank to an intermediate chamber designed to accept only, or otherwise measure, the precise quantity of fuel to be charged to each storage container and then transferring such measured quantity to each storage chamber.

Figure 5C:
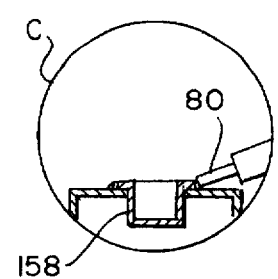

FIGS. 5A, 5B and 5C illustrate a particularly advantageous, and heretofore novel, method of sealing the fuel storage containers. FIGS. 5B and 5C illustrate subsequent operations occurring at the fuel storage container's fill port located within the circle "C" of each of the figures. Since the fill port is very small, typically in the range of 1 mm to 10 mm in diameter, and the stopper is likewise very small, the manipulation and insertion of the miniature stopper can be difficult to accomplish manually or with most high speed automated assembly equipment. In this embodiment a rod-like structure 150 of multiple stoppers arranged end-to-end is fed from a roll, or reel 151, into and through a guide tube 152 which can be controlled to direct the lead stopper 154, at the end of the rod, into the fill port 36 of the filled storage chamber 112. The reel of rod-like structures and the guide tube are mounted at the second station 54 so as to be moveable from a first position where they are out of the way of the fill head 64 as it is operatively connected to the fuel storage container 112, to a second position where the reel and guide tube are in position to seal the fill port 36 of the filled fuel storage container 112. Each stopper has a body portion at its leading end having a diameter b (see FIG. 6) essentially equal to the diameter of the fill port 36 and a rim portion at its following end having a diameter c (FIG. 6) which is larger than the diameter of the fill port. The leading end of the stopper is forced into the fill port until the rim of the stopper abuts the storage container adjacent the fill port. A cutting device 156 (FIG. 5B) then cuts the head of the inserted stopper 158 free of the next stopper 160 on the rod. The fill tube containing the rod of stoppers is then moved away from the fuel storage container. The fuel storage container 112 is then moved to the third station 56 where an ultrasonic or laser welding device 80 (FIG. 5C) is positioned adjacent the stopper and activated to permanently seal the rim of the stopper 158 to the adjoining portion of the container 112.

Figure 6:
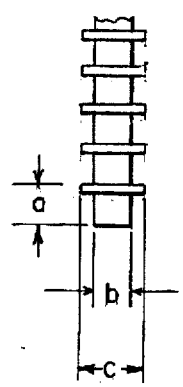
FIG. 6 illustrates an extended rod of stoppers as used in the method illustrated in FIGS. 5A, 5B and 5C.

As illustrated in FIG. 6, each stopper has a length a, which is about 2 mm to about 10 mm, and, at its lead end, has a body portion having a diameter b which is the same as, or, preferably, slightly larger than the diameter of the fill port 36. Typically, the diameter b of the body portion of the stopper is about 1 mm to about 10 mm and, preferably, about 2 mm to about 5 mm. Each stopper has, at its following end, a rim portion having a diameter c which is about 2 mm to about 5 mm larger than the diameter of the body portion. The rod-like structure of stoppers can be made of metal, such as stainless steel; plastic, such as polyolefin; or ceramic. It can be produced by well known techniques, such as molding or impact processing. The stoppers preferably are made of a material which is similar to, but harder than, the material of the storage container in which they are to be inserted.

While it is preferred that the plurality of stoppers form a rod which can be stored in, and fed from, a rolled condition, it is not necessary that the structure be sufficiently flexible to permit such a rolled form. Relatively inflexible rod-like structures can be stored and fed to the fill tube as essentially straight rods. Alternatively, stoppers of relatively inflexible material can be fed as a plurality of individual stoppers arranged end-to-end and held in place by an encircling tube, which tube is shrunk around the plurality of individual stoppers by well known vacuum-sealing or shrink-fitting processes, to result in an extended structure which has sufficient stiffness to maintain itself in a rod-like form and yet is sufficiently flexible to be stored in, and fed from, a rolled form.

The use of similar metal and plastic materials to fabricate both the storage container and the stopper is preferred because it is easier to weld similar materials. However, when the stopper and the storage chamber are made of dissimilar materials or are made of materials which cannot be welded, such as ceramics, the bonding of the stopper to the storage container can be enhanced by providing an adhesive, sealing or other bonding material between the stopper and the storage container. Such a bonding material could be applied during assembly to either the rod-like structure or to the fill port. Further, the leading end of the stopper can be provided with a tapered or beveled surface to assist its insertion into the fill port.

As illustrated in FIG. 3 the three operations of liquid fuel filling, stopper insertion and welding are accomplished at two stations. These operations can, however, be conducted at one, two or three individual stations. Moreover, the fuel containers can be conveyed from station to station by any suitable known type of conveyer, such as the belt conveyer shown in FIG. 3, a rotary conveyor or a dial table.

No unnecessary limitations on the invention should be assumed from the foregoing description. That description is intended to provide a full, clear, concise and exact explanation of the inventive methods of assembling an inflator and filling it with a liquid fuel and the inventive apparatus for practicing such methods. The scope of the invention is as set forth in the following claims.

We claim:

1. A method of assembling an inflator for use in an airbag assembly comprising:

(a) providing a storage container having a fill port;

(b) inserting one end of a conduit through said fill port;

(c) injecting a predetermined quantity of liquid fuel into said storage container through said conduit;

(d) initiating the withdrawal of said conduit from said container after the level of said liquid fuel has risen above said end of said conduit and before the injection of said predetermined quantity is completed;

(e) removing said end of said conduit from beneath the level of said liquid fuel after said predetermined quantity of fuel has been added to said storage container;

(f) providing a stopper having a leading end and a following end, said following end containing a rim portion of greater diameter than the remainder of said stopper;

(g) inserting the leading end of said stopper in said fill port until said rim portion contacts the surface of said storage container adjacent said fill port;

(h) welding said rim portion of said stopper to the surface of said storage container adjacent said fill port; and (i) assembling the storage container containing said liquid fuel into an inflator housing.

* * * * *